United States Patent [19]
Honey

[11] Patent Number: 5,562,167
[45] Date of Patent: Oct. 8, 1996

[54] IMPLEMENT CASTER WHEEL

[75] Inventor: Gregory J. Honey, Bracken, Canada

[73] Assignee: Honey Bee Manufacturing Ltd., Frontier, Canada

[21] Appl. No.: 463,673

[22] Filed: Jun. 5, 1995

[51] Int. Cl.$^6$ ................................ A01B 51/04
[52] U.S. Cl. ...................... 172/386; 172/385; 16/18 R; 16/43
[58] Field of Search .................. 172/282, 383, 172/385, 384, 386; 16/18 A, 44, 18 R, 43, 31 R

[56] References Cited

U.S. PATENT DOCUMENTS

| | | | |
|---|---|---|---|
| 1,659,234 | 2/1928 | Boda | 172/386 |
| 1,815,332 | 7/1931 | Scarlett | 172/386 |
| 2,044,718 | 6/1936 | Rutter | 172/386 |
| 2,334,888 | 11/1943 | Strandlund | 172/386 |
| 2,981,344 | 4/1961 | Roberson | 172/386 |
| 3,106,971 | 10/1963 | Bushmeyer et al. | 172/385 |
| 3,701,385 | 10/1972 | Patterson et al. | 172/386 |
| 4,154,451 | 5/1979 | Young | 172/386 |

FOREIGN PATENT DOCUMENTS

| | | | |
|---|---|---|---|
| 40070 | 10/1932 | Czechoslovakia | 172/386 |
| 536008 | 10/1931 | Germany | 172/386 |
| 551240 | 2/1943 | United Kingdom | 172/386 |

Primary Examiner—Terry Lee Melius
Assistant Examiner—Spencer K. Warnick
Attorney, Agent, or Firm—Kerkam, Stowell, Kondracki & Clarke, P.C.; John C. Kerins

[57] ABSTRACT

A mounting assembly of a gauge wheel for an implement, such as an agricultural crop harvesting header, the mounting assembly including a king pin member rotatably mounted in a king pin bushing housing and having a wheel spindle projecting substantially horizontally from one side of a king pin shaft for rotatably mounting the gauge wheel. The rotational axis of the king pin shaft is tilted rearwardly and upwardly relative to the vertical and sideways and upwardly relative to the vertical in a direction opposite to the side of the projecting wheel spindle. Accordingly, when the gauge wheel enters a caster turn in a direction corresponding to the direction of projection of the wheel spindle the axis of the wheel spindle swings from a substantially transverse direction in relation to the straight ahead travel direction towards a rearwardly and downwardly inclined orientation. A spring is arranged to bias the king pin shaft to turn in a direction counter to a caster turn, and stops are provided to limit the rotation of the king pin shaft between a substantially straight ahead travel condition and a caster turn of a preselected amount of turn. Effective castering of a gauge wheel at the inside of a turn is accomplished together with good straight ahead stability. The structure also allows positioning of the castering gauge wheel close to the framework of the header.

19 Claims, 9 Drawing Sheets

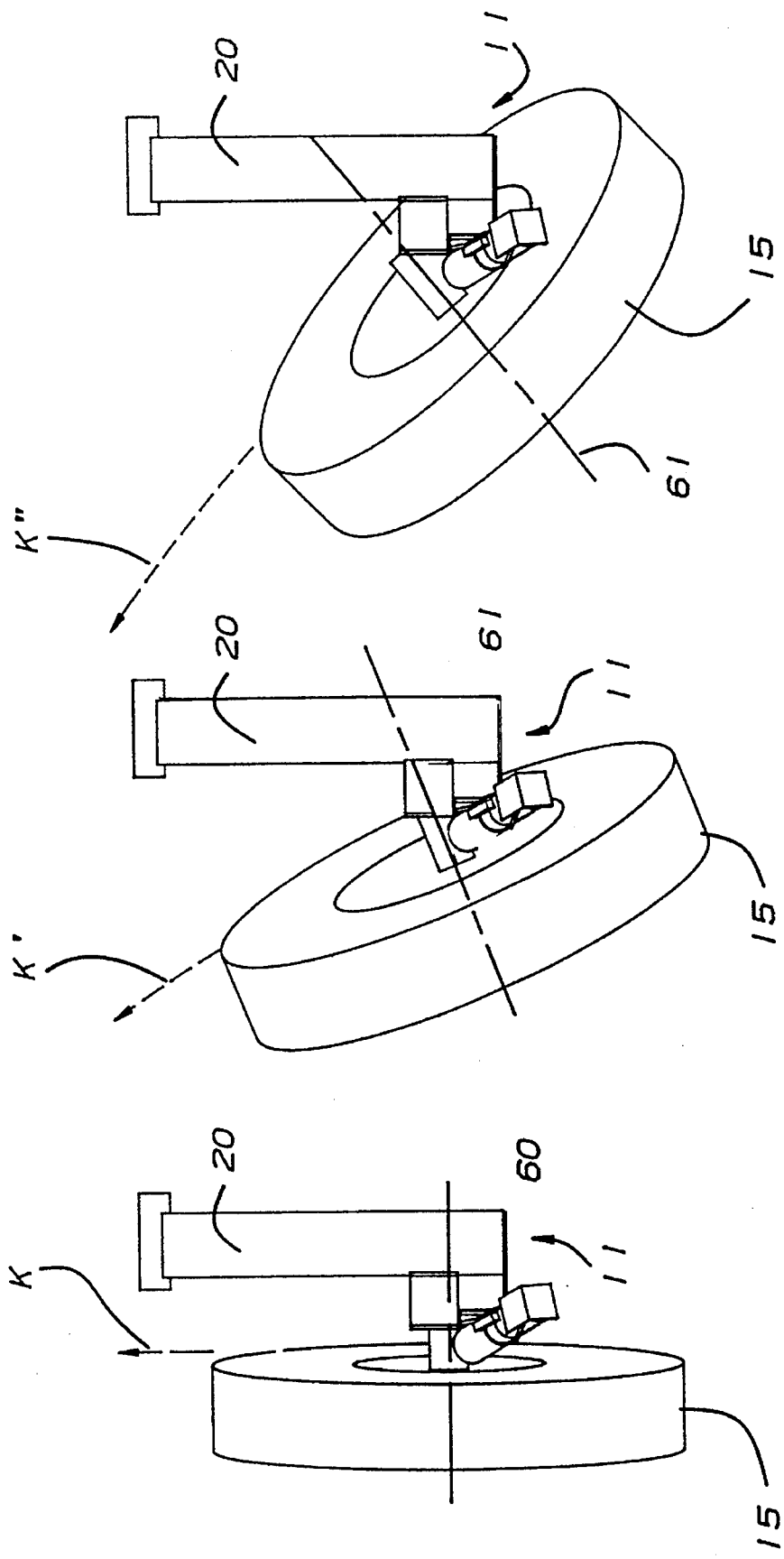

IMPLEMENT CASTER WHEEL

BACKGROUND OF THE INVENTION

1. Field of the Invention

This invention relates to a mount assembly for a caster wheel of the type provided for supporting an agricultural implement, or at least a part thereof, as the implement travels over the terrain.

2. Description of the Prior Art

Numerous types of agricultural implements are provided with support wheels for supporting a part of an implement such as a swather or combine header which is mounted on a hydraulic lift system at the front of a tractor or combine unit. The headers have considerable width transverse to the direction of travel relative to the width of the propelling unit, and supporting wheels, commonly called gauge wheels, are provided adjacent the outer ends of the header. The gauge wheels have commonly been mounted on an arm which is connected at a front end to a frame member of the header, the arm having a wheel spindle at its rear end, the spindle projecting in a direction transverse to the direction of travel. The gauge wheel is mounted for rotation on the spindle. With this simpler form of mounting for the gauge wheel, it is apparent that there is an excessive amount of side scuffing of the wheel with the ground when the implement is being manoeuvered through a turn. This is particularly true in relation to the tire of the gauge wheel at the inside of a turn where it is not unusual during a short turn for the tire of the inside wheel in the turn to actually gouge the field. Even during a short turn, the tire of the gauge wheel on the outside of the turn usually does not present a problem because its radius of turn is much larger. Thus, it is not necessary for the outside gauge wheel to caster in a turn. In any event, because of the difficulty experienced by the wheel on the inside, there is not only excessive wear and potential damage to the tire and wheel, but considerable strain is also put on the mounting arm and its pivot connection to the frame. Another problem which is present is some caster wheel designs is that in straight ahead travel the wheel is affected by the surface of the ground to the extent it does not track truly.

While caster type wheels which are mounted to allow free 360 degree revolving of the wheel about a substantially vertical axis are used on some implements, such an arrangement is not particularly feasible in implements such as headers as the mounting position for such a caster wheel would have to be a considerable distance behind the header for clearance during its revolving action. Another alternative which is known involves a wheel mounted on an assembly which turns about a substantially vertical axis, and wherein the steer is controlled by a powered steering mechanism, such as one using a hydraulically operated cylinder. Such an arrangement and any associated automatic control adds considerably to the cost of the implement as well as to its maintenance costs. An apparatus of a type including a mechanism for locking a castor wheel other than when cornering is shown in Canadian Patent No. 1,331,842, Jeannotte, Sep. 6, 1994.

SUMMARY OF THE INVENTION

It is an object of the present invention to provide an effective implement caster wheel mounting assembly which can be conveniently mounted close to a frame member of an implement, such as a swather or combine header, and which allows appropriate turning of the gauge wheel at the inside of a turn to avoid scuffing during a turn. A feature of the invention also automatically achieves straight travel of the wheel during normal forward movement of the implement.

According to the present invention there is provided a mounting assembly for a caster wheel of an implement, the mounting including a wheel mounting arm having an attachment means for connecting the arm to a frame member and a king pin mounting housing attached to the arms at a location spaced from the attachment means. A king pin member includes a wheel spindle mounting portion and a king pin shaft received in the king pin mounting housing for rotation about a longitudinal axis of said king pin shaft. A wheel spindle projects from one side of the spindle mounting portion and defines a wheel axis extending substantially horizontally. The axis of the king pin shaft is tilted upwardly and rearwardly from the vertical and is tilted outwardly from the vertical in a direction opposite to the side of the projecting wheel spindle. Thus, in a caster turn away from a straight ahead travel condition and in the same direction as the projection of the wheel spindle, the axis of the wheel spindle swings from a transverse and substantially horizontal orientation towards a more rearwardly and downwardly inclined position.

In an embodiment of the invention, there is provided a spring means engaging said king pin member and biasing the king pin shaft to rotate in a direction opposite the caster turn.

According to a specific embodiment of the invention, there is also provided in the mounting assembly of the present invention a first stop for limiting rotation of the king pin shaft in the direct opposite the caster turn. Preferably there is provided a second stop means for limiting the caster turn of the king pin shaft to a predetermined maximum.

More specifically the caster turn between the positions determined by the first and second stop means is about 55 degrees.

BRIEF DESCRIPTION OF THE DRAWINGS

In the accompanying drawings, which show an embodiment of the invention, as an example.

FIGS. 10A, 10B and 10C are top views of the caster wheel mount assembly of the present invention illustrating the position of the wheel as it progresses into a full caster turn at FIG. 10C from its normal straight ahead position of FIG. 10A, and FIGS 11A, 11B and 11C are rear views of the assembly of FIGS. 10A, 10B and 10C showing the wheel position as it progresses into the caster turn from the normal straight ahead position.

DESCRIPTION OF A PREFERRED EMBODIMENT

Figure 1:
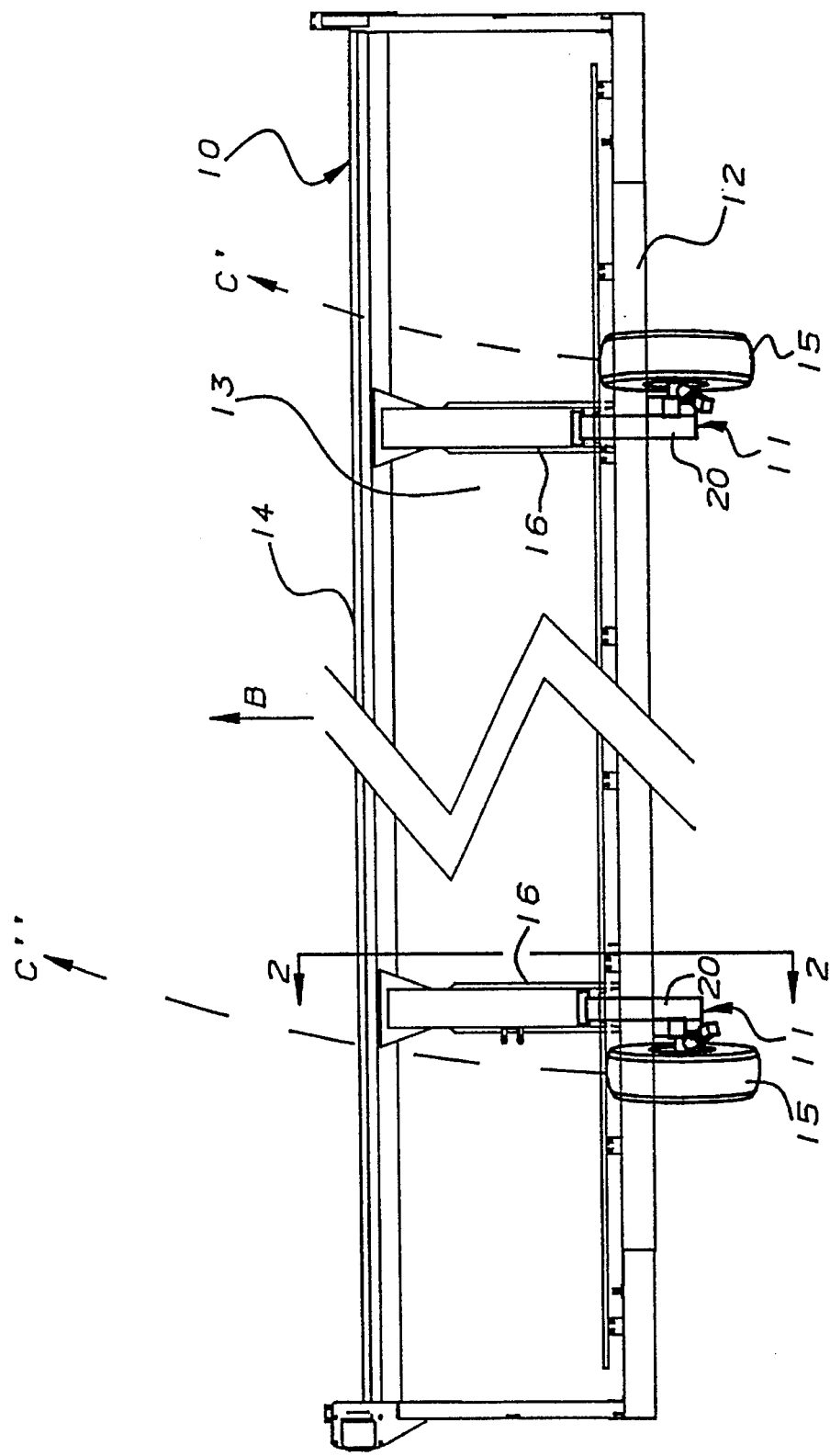
FIG. 1 is a top view showing outer opposite ends of a combine header supported by a pair of caster wheels each carried in a mount assembly of the present invention.
Figure 2:
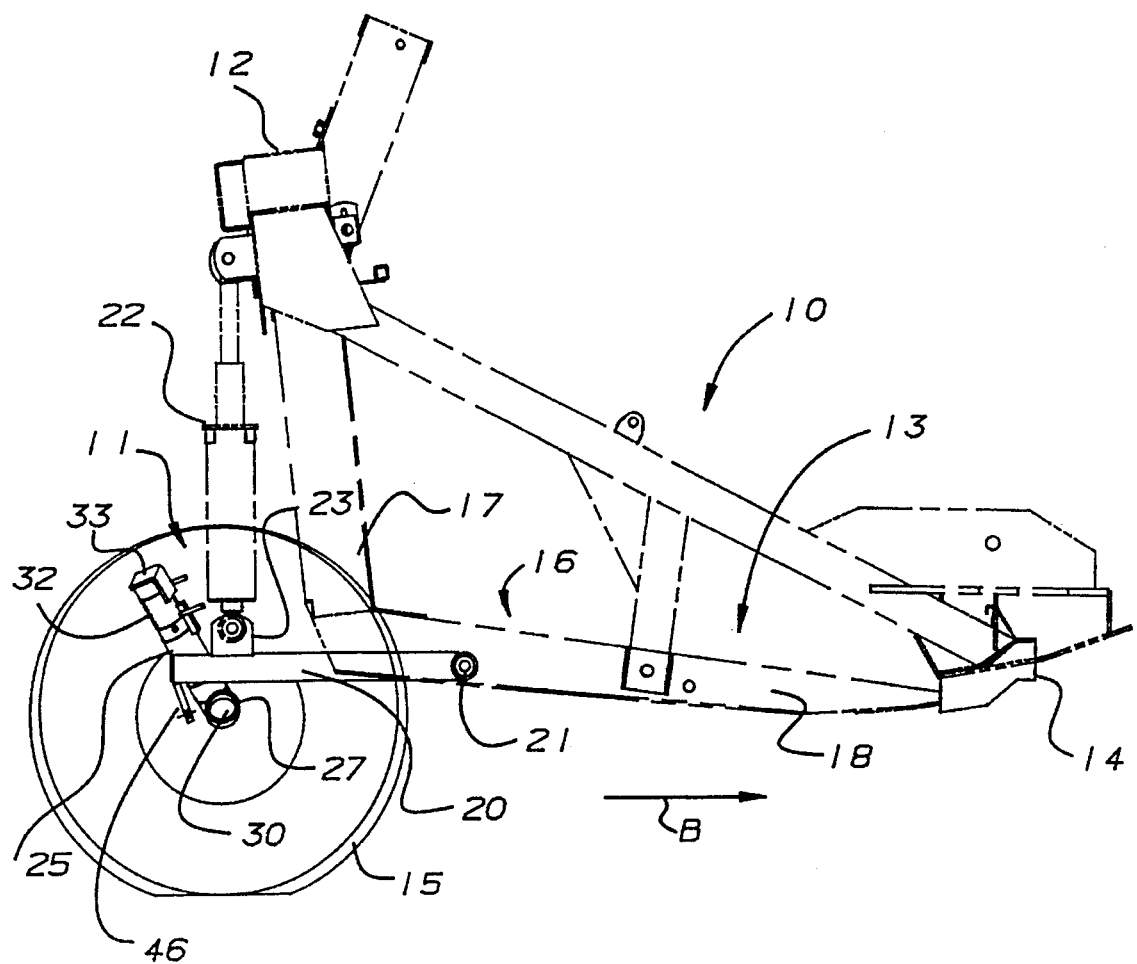
FIG. 2 is an enlarged cross sectional view as seen from the line 2—2 of FIG. 1.
Figure 3:
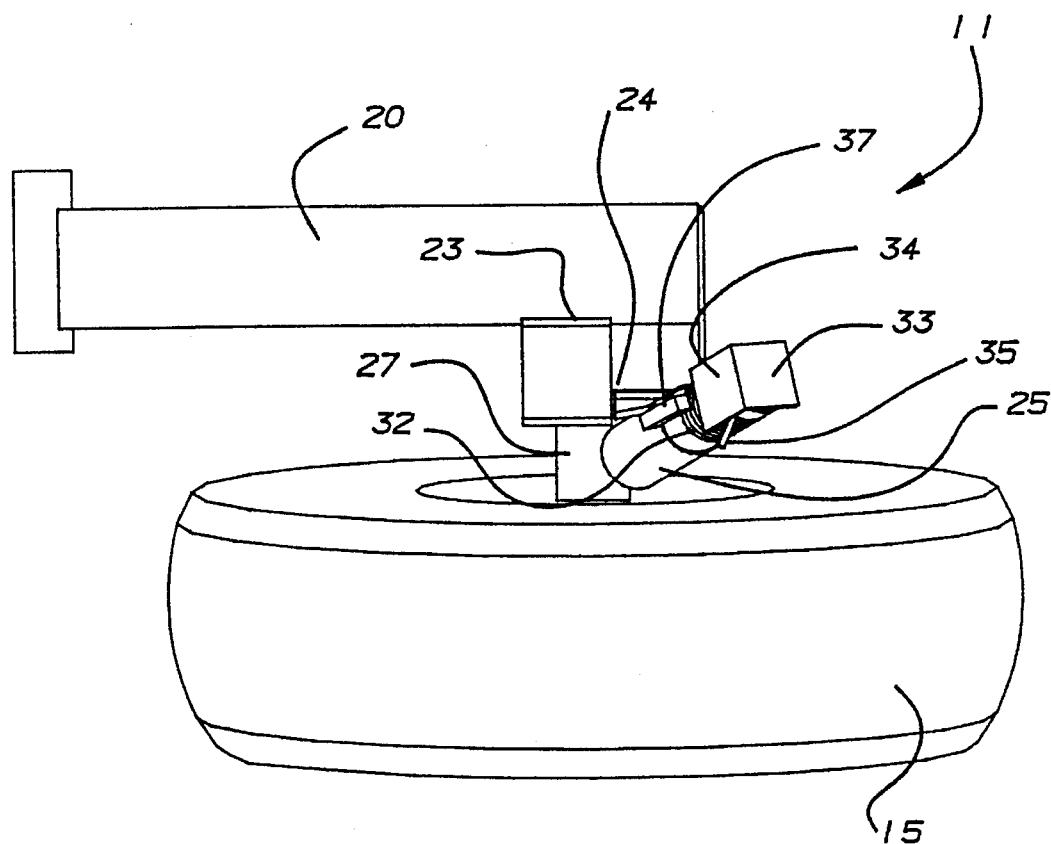
FIG. 3 is a still further enlarged top view of the caster wheel and mount assembly as shown at the left hand end of FIG. 1.

Referring to FIG. 1 and 2 which shows opposite ends of a header 10, caster wheel mount assemblies 11 of the present invention are provided adjacent the outer ends of the header 10. Briefly the header 10 includes an upper transverse main frame member 12 from which is suspended a deck 13. A sickle bar 14 extends across the front of the deck 13 for cutting a crop as the header is moved forwardly in the direction of the arrow B by a tractor or combine unit (not shown). The header 10 is mounted on the front of the tractor or combine unit by way of a hydraulic lift system so that the entire head can be lifted to an inoperative position or lowered to its cutting position. The outer ends of the header are at least partially supported in the lowered position by the gauge wheels 15 which are attached to the header by the wheel mount assemblies 11 of the present invention. As previously indicated, it has been known to mount gauge wheels which rotate about a horizontal axis but have no provisions for turning about a vertical axis. Thus, in such a mount design, the wheel does not track the radius of turn of the header as the tractor or combine steers to the right or left, such as in a turn at the end of a field having finished a swath along the field. As can be seen in comparing arrows C' and C" of FIG. 1, the gauge wheel 15 at the inside of the turn experiences a much sharper turn than the outside wheel, and without the ability to in effect turn, there is experienced considerable sideways scuffing.

In addition to the transverse frame member 12, the header also includes frame members 16, which include an upright portion 17 and a forwardly projecting portion 18 on which the deck 13 is carried (FIG. 2). Each mount assembly 11 includes an arm 20 which is pivotally connected at its forward end, by way of a pivot pin 21, to the portion 18 of the frame member 16. The pivot pin 21 allows the arms to pivot about a substantially horizontal axis extending transversely to the direction of normal travel of the header so that the arm 20 can swing up and down in an arc disposed in a substantially vertical plane which is in the direction of travel of the header. The arm normally extends rearwardly from the pivot pin and is held in a substantially horizontal position by way of a compression strut, such as a shock absorbing unit 22, connected between the main frame 2 and an upright lug 23 affixed to the arm 20 near its rear end. The unit 22 is selected to provide a downward resilient bias to transmit a portion of the weight of the outer end of the header to the wheel 15 so that the head is maintained level, but will allow some upper movement of the wheel 15 by way of the arm 20 pivoting upward, when, for example, the wheel encounters an unevenness of the ground or other obstacles. The unit 22 includes a cylindrical member containing a compression spring (not shown), and may include adjustment means so as to be able to control its downwardly bearing effect.

Figure 5:
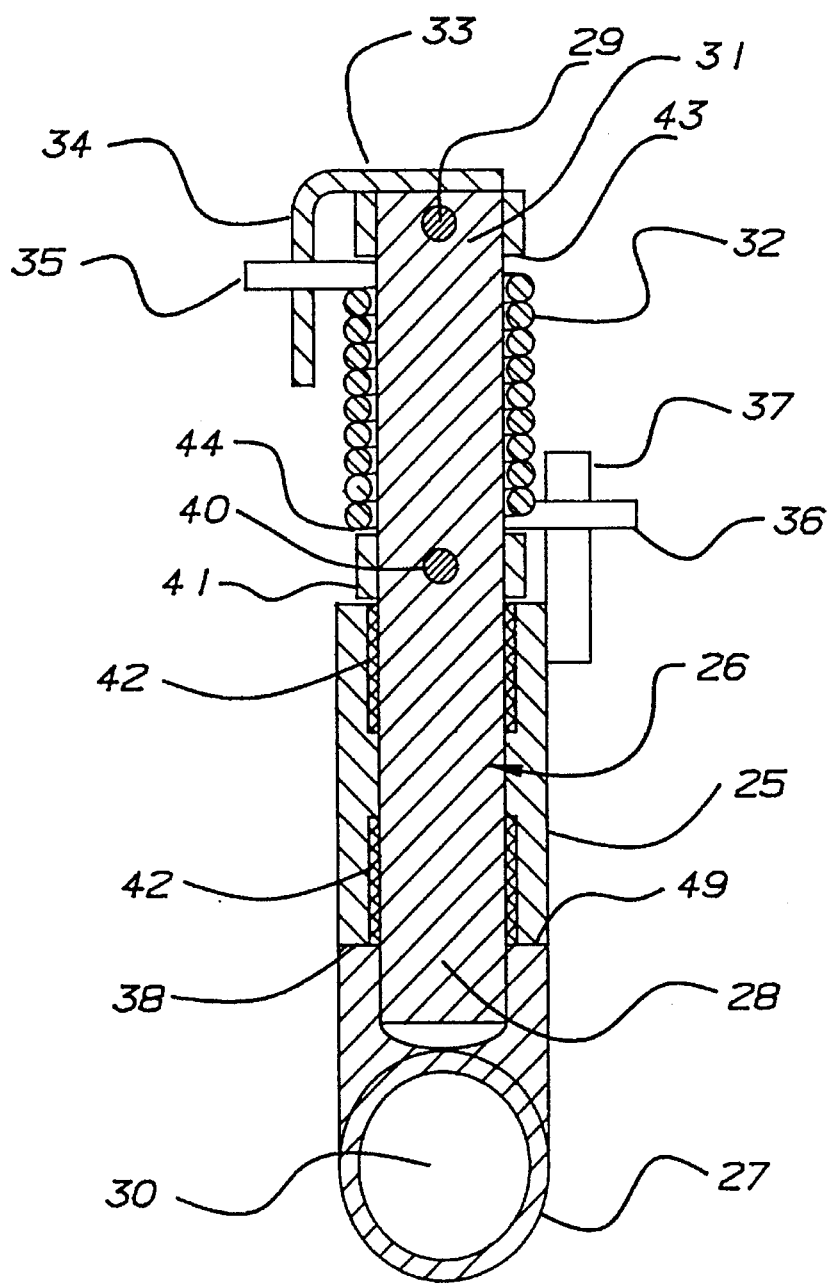
FIG. 5 is a cross sectional view as seen from the line 5—5 of FIG. 4.

Affixed rigidly to the side of the rear end portion of the arm 20, by way of a mounting bracket 24, is a king pin bushing housing 25 which receives for rotation therein a king pin member 26. The king pin member 26 is in the form of a shaft 28 of circular cross section which has integrally formed therewith at its lower end a spindle mounting portion in the form of a tubular housing 27 for receiving a wheel spindle 30 on which wheel 15 is rotatably mounted. The upper end portion 31 of the king pin shaft 28 extends above the housing 25, and a biasing means in the form of a torsional coil spring 32 encircles the upper end portion 31. A cap 33 is affixed to the upper end portion 31 by way of a bolt 29 which passes through the shaft 28 and the cap 33 so that the cap 33 turns with the king pin shaft 28. The cap 33, has a downwardly projection tab 34. The tubular housing 27 which forms the lower portion of the king pin member 26 is affixed to the king pin shaft 28 and provides an upper shoulder 49 which bears against a lower end surface 38 of the king pin bushing housing 25. Affixed to the king pin shaft 28 above an upper end surface 39 of the king pin bushing housing 25, by way of a bolt 40, is a collar 41. Thus, vertical movement of the king pin shaft 28 is restricted, but the shaft 28 is journalled for free turning within the bearing members 42 contained within the king pin bushing housing 25 (FIG. 5).

The spring 32 is contained between a lower end surface 43 of the cap 33 and an upper end surface 44 of the collar 41. Opposite ends 35 and 36 of the spring project radially from the spring, the upper end 35 engaging the tab 34 of the cap 33 and the lower end 36 engaging an upward projecting stop member 37 which is affixed to the bushing housing 25. Thus, while the spring 32 may be prewound to bias the king pin against rotation as the wheel 15 turns to a caster position, the spring experiences a winding effect which reacts in its contact with the tab 34 to bias the king pin shaft 26 to return the wheel 15 to a straight ahead condition.

Figure 4:
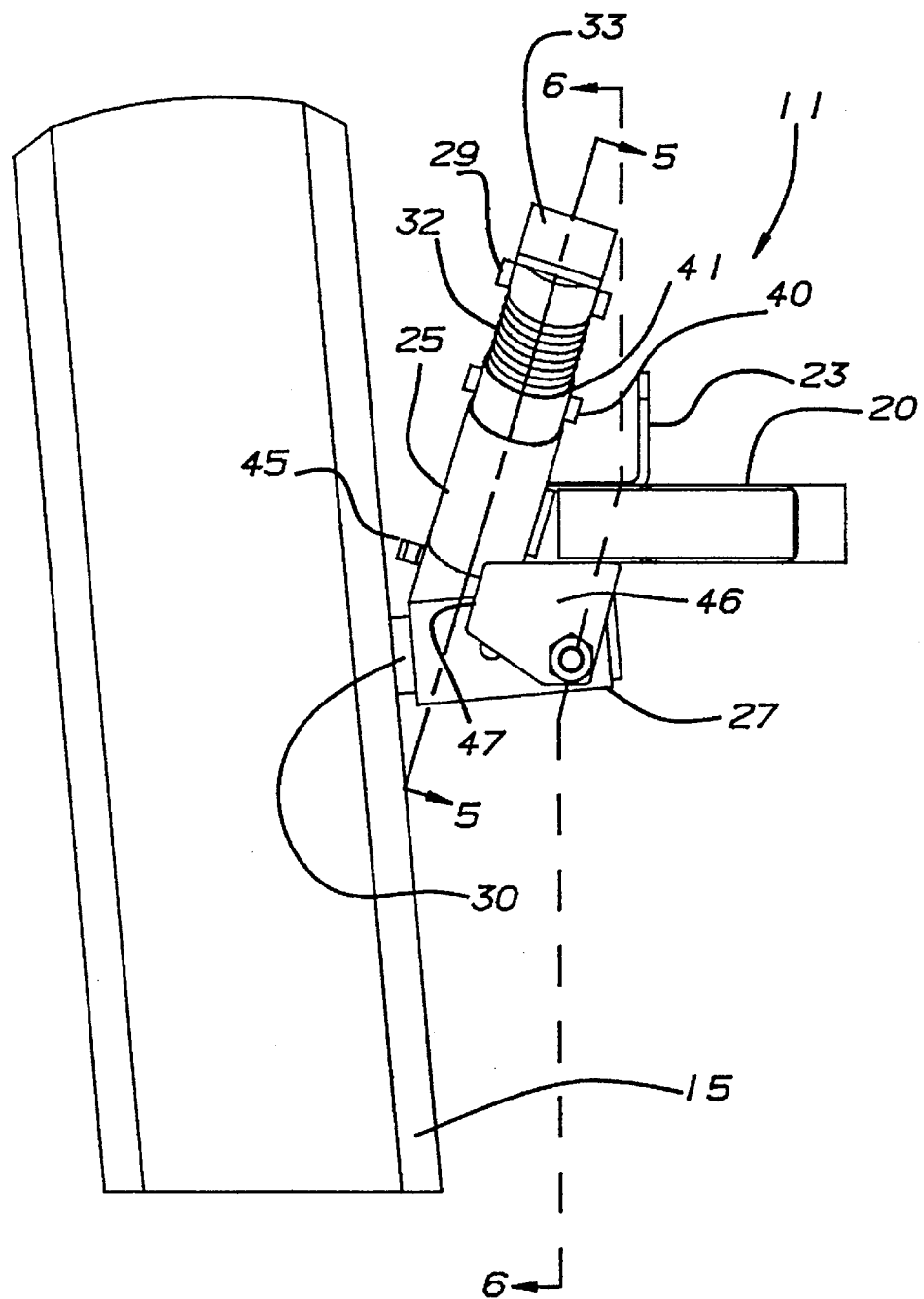
FIG. 4 is a rear view of the caster wheel and mount assembly of FIG. 3.
Figure 6:
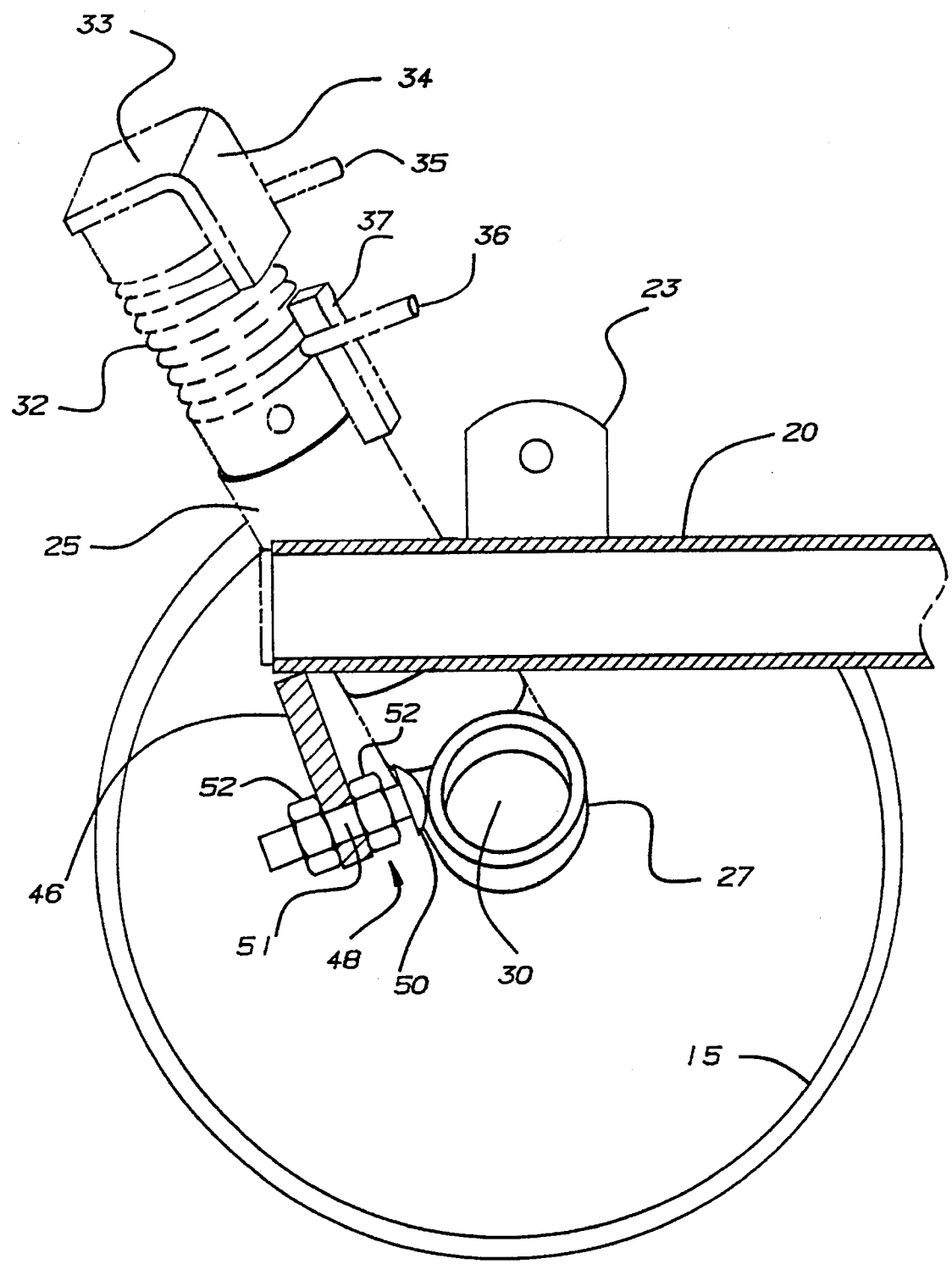
FIG. 6 is a cross sectional view as seen from the line 6—6 of FIG. 4.
Figure 7:
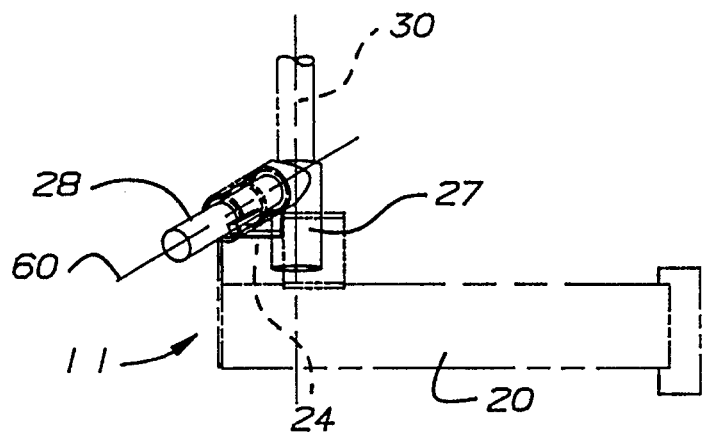
FIG. 7 is a top view similar to FIG. 3, on a small scale and showing only the king pin member in its relationship to the king pin bushing housing.
Figures 8, 9:
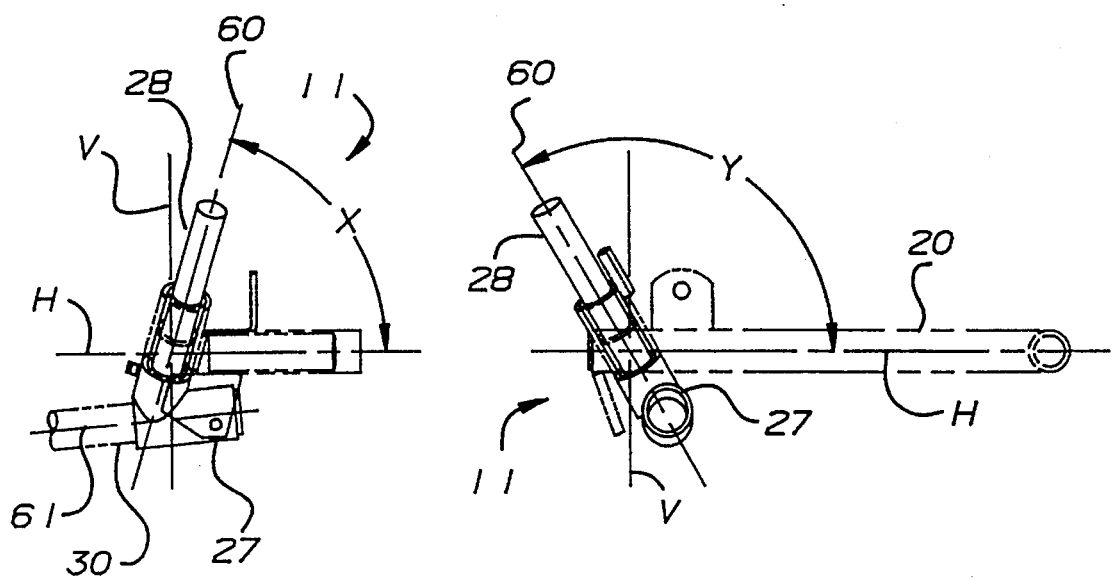
FIG. 8 is a side view of the king pin member as shown in FIG. 7.
FIG. 9 is a rear view of the king pin member as shown in FIG. 7.

In order to limit the turn of the king pin member 26 into a caster turn, the lower portion of the king pin member 26 is provided with a radially projecting stop member 45 affixed thereto (FIG. 4). Rigidly affixed to the mounting bracket 24 is a lug or flange 46 which provides a stop engaging surface 47 against which the stop member 45 engages when the wheel has reached its maximum permissible caster turn. In order to limit the turn of the wheel during its return to the straight ahead position, there is provided in association with the flange, a stop means 48 which engages the portion of the king pin member 26 formed by the tubular housing 27. The stop means 48 includes a bolt 50 which passes through a hole 51 in the flange 46, and a pair of nuts 52 threaded onto the bolt 41, one on either side of the flange 46. Thus, by adjusting the position of the nuts 52, the head of the bolt 50 can be moved toward or away from the housing 27 thereby establishing the position of the king pin member 26 when it has returned substantially to the straight ahead position (FIG. 6). As best illustrated in FIGS. 7 to 9, the central axis 60 of the king pin shaft 28 about which the king pin member 26 rotates in its castering action is tilting. The tilt is in an upwardly direction, both rearwardly and away from the side of the spindle housing from which the wheel spindle 30 projects. The angle between the horizontal H and the central axis 60 is shown as X (FIG. 4). As indicated, the tilt of the axis 60 is away from the side of the wheel spindle housing, and the angle X may be in the order of about 63 degrees to about 83 degrees, and preferably about 73 degrees. The angle between the horizontal upward and rearward tilt of the central axis 60 as shown at Y is between about 110 degrees and about 130 degrees and preferably about 120 degrees. Alternatively stated, the axis 60 of the turn of the king pin member 26 is tilted upwardly and outwardly from the vertical V at the side of the king pin member opposite to the wheel spindle in the range of about 7 degrees to about 27 degrees, and preferably about 17 degrees, while the tilt of the axis 60 is upwardly and rearwardly from the vertical in the range of about 20 degrees to about 40 degrees, and preferably about 30 degrees.

Figure 11C:
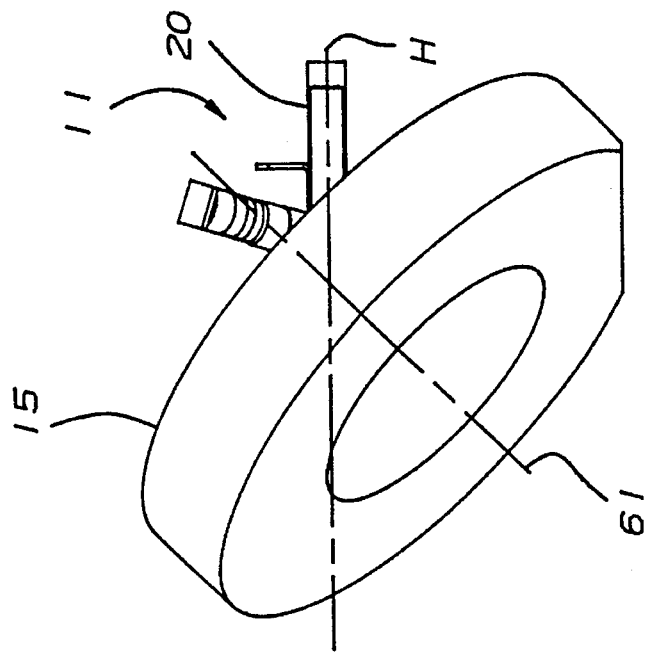
Figure 11B:
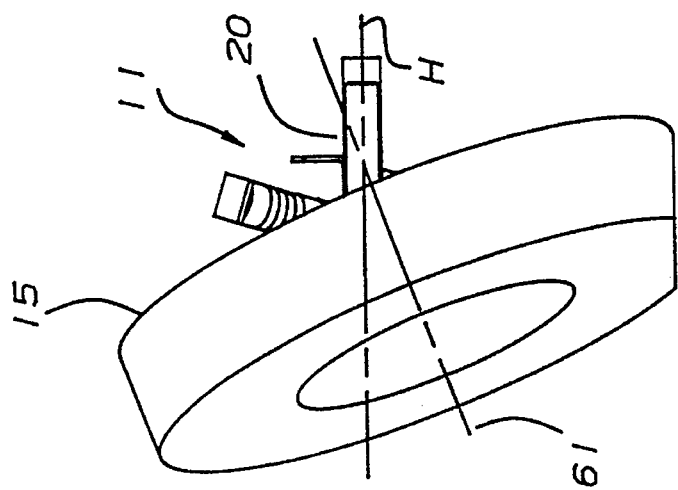

The result of the above stated angles of tilt of the axis 60 of rotation of the king pin member is that as the header enters a turn to the left, as illustrated by arrows K, K' and K" in FIGS. 10A, 10B and 10C, the wheel 15 is free to caster into the turn due to the turn of the king pin shaft about its axis. The caster occurs as the axis 61 swings rearwardly to a position in which the axis 61 of the wheel spindle is normal to the plane in the direction of the wheel travel in the turn. At the same time the axis 61 tilts downwardly relative to the horizontal 14 as seen from the rear views of FIGS. 11A, 11B and 11C.

The effect of the above described castering of the wheel has proven to achieve a number of desired characteristics, particularly when also incorporating the stop means for limiting the amount of caster and the spring means to assist in return of the wheel to its straight ahead travel. The wheel has been found to turn smoothly and accurately into a turn in the direction of travel of the end of the header on which the wheel is mounted, i.e. when the wheel is at the inside of the turn. Additionally the wheel returns accurately to the straight ahead position where it remains without undue wobble as frequently occurs with conventional caster wheel designs. Because of its limited caster travel and the angle relative to the ground surface it assumes during a turn it can be mounted as close to the frame work as non-castering gauge wheels, but at the same time, of course avoiding side scuff and the stresses established by stationary gauge wheels.

Figure 11A:
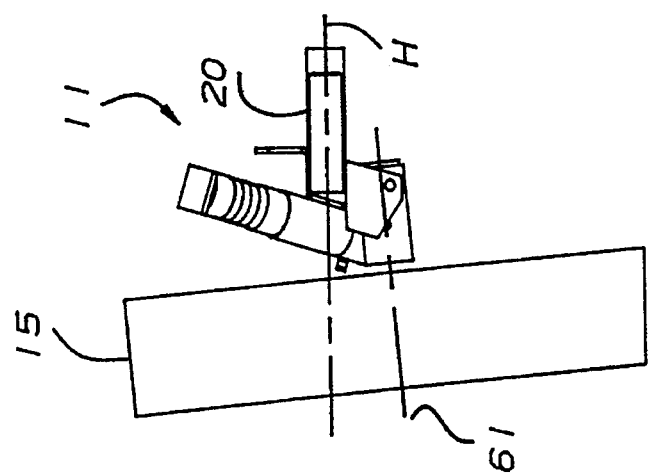

As in most apparent from FIGS. 9 and 11A, the relationship between the shaft 28 and the tubular housing 27 may be such that the axis of the wheel spindle 30 which determines the axis 61 of the rotation of the wheel 15 in the straight ahead travel the axis 61 is not entirely horizontal. The axis 61 may slope downwardly away from the horizontal H in the direction of the projection of the spindle at an angle of about 5 degrees. This results, of course, in the plane of the wheel 15 which is normal to the axis 61 of rotation sloping slightly away from the vertical. This feature has been found desirable to allow for distortion which can occur due to the full weight of the header on the gauge wheel.

In relation to the amount of maximum caster turn of the wheel which is determined between the location of engagement of stop 45 with the stop engaging surface 47 in an extreme caster turn and the engagement of stop means 50 with the tubular housing of the king pin member 26 on return from the caster turn, it has been found desirable that this maximum permissible caster turn be limited to about 55 degrees.

While a preferred embodiment of the invention has been shown as an example, alternate features which are within the spirit of the invention as defined in the appending claims will be obvious to those skilled in the art.

What I claim is:

1. A mounting assembly for a caster wheel of an implement, said assembly comprising:

a wheel mounting arm having attachment means for connecting said arm to a frame member of the implement, a king pin bushing housing affixed to said arm at a location spaced from said attachment means, a king pin member including a wheel spindle mounting portion and a king pin shaft received in said king pin housing for rotation about a longitudinal axis thereof, a wheel spindle projecting from one side of said mounting portion and defining a wheel axis of rotation extending substantially horizontally, said rotation of said king pin shaft about said longitudinal axis providing a castering turn away from a straight ahead travel position of said wheel and toward a caster turn position of said wheel, said castering turn being in a direction toward said one side of said mounting portion, said axis rotation of the king pin shaft being tilted upwardly and rearwardly from a vertical reference line, said axis of rotation of said king pin shaft also having a sideways tilt upwardly and outwardly from said vertical reference line in a direction opposite to said one side of said mounting portion from which said wheel spindle projects, whereby during said castering turn away from said straight ahead travel position in the direction of the projection of said wheel spindle, said wheel axis of said wheel spindle swings from a transverse and substantially horizontal orientation towards a rearwardly and downwardly inclined orientation.

2. A mounting assembly as defined in claim 1, and further including spring means engaging said king pin member and providing a biasing force on said king pin shaft to rotate in a direction from said caster turn position toward said straight ahead travel position.

3. A mounting assembly as defined in claim 2, and further including a first stop means for limiting rotation of said king pin shaft from said caster turn position to thereby establish said straight ahead travel position.

4. A mounting assembly as defined in claim 3 further including a second stop means for limiting said castering turn of said king pin shaft to said caster turn position of a preselected maximum.

5. A mounting assembly as defined in claim 4, wherein said first stop means includes a member fixed relative to said arm and engagable with said king pin member to limit the rotation of said king pin shaft from said caster turn position for positioning said wheel spindle substantially in said straight ahead travel position.

6. A mounting assembly as defined in claim 5, wherein said castering turn between said straight ahead travel position and said caster turn position determined by said first and second stop means is about 55 degrees.

7. A mounting assembly as defined in claim 3, wherein said first stop means limits said turn of said king pin shaft to a position in which said axis of said wheel spindle projects substantially normal to a straight ahead travel direction of said implement.

8. A mounting assembly as defined in claim 7, wherein first stop means is adjustable to permit variation of said straight ahead travel position of said king pin member relative to said king pin bushing housing.

9. A mounting assembly as defined in claim 1, wherein said upward and rearward tilt of said axis of said king pin shaft relative to said vertical reference line is in the range from about 7 degrees to about 27 degrees.

10. A mounting assembly as defined in claim 9, wherein said upward and rearward tilt of said axis of said king pin shaft relative to said vertical reference line is about 17 degrees.

11. A mounting assembly as defined in claim 1, wherein said sideways tilt of said axis of said king pin relative to said vertical reference line is in the range of from about 20 degrees to about 40 degrees.

12. A mounting assembly as defined in claim 11, wherein said sideways tilt of said axis of said king pin shaft relative to said vertical reference line is about 30 degrees.

13. A mounting assembly as defined in claim 2, wherein, said king pin shaft extends through said king pin bushing housing and includes an upper portion of said king pin shaft above said king pin bushing housing, said king pin member further includes a cap means affixed to a top end of said upper portion, and said spring means includes a torsional spring encircling said upper portion of said king pin shaft, said cap means engaging an upper end of said spring and said king pin bushing housing engaging a lower end of said spring, whereby a rotation of said king pin shaft relative to said king pin bushing housing during said castering turn further winds said spring to increase said biasing force for returning said king pin member toward said straight ahead travel position.

14. A mounting assembly as defined in claim 1, wherein said attachment means of said arm includes a pivot connection, said arm extending rearwardly from said frame member, said arm having an affixing bracket for rigidly securing said king pin bushing housing to a rear portion of said arm.

15. A mounting assembly as defined in claim 5, and including an affixing bracket for securing said king pin bushing housing to said arm, and wherein said second stop means includes a stop member projecting from said king pin member, and a stop engaging member affixed to said bracket and located for engagement by said stop member on rotation of said king pin member to limit said castering turn.

16. A mounting assembly as defined in claim 5, wherein said first stop means includes a lug fixed relative to said arm in a position for engagement by said king pin member on rotation of said king pin member from said caster turn position.

17. A mounting assembly as defined in claim 16 wherein said first stop means includes an adjustable bolt means carried by said lug for varying the limit of rotation of said king pin shaft from said caster turn position.

18. A mounting assembly for a caster wheel of an implement, said assembly comprising:

a wheel mounting arm having attachment means for connecting said arm to a frame member of the implement, a king pin bushing housing affixed to said arm at a location spaced from said attachment means, a king pin member including a wheel spindle mounting portion and a king pin shaft, a wheel spindle projecting from one side of said mounting portion and defining a wheel axis of rotation extending substantially horizontally and in a direction substantially normal to a straight ahead direction of travel of the implement, said king pin shaft being received in said king pin bushing housing for rotation about a longitudinal axis thereof during a castering turning of said king pin member away from a straight ahead travel position to a caster turn position, spring means engaging said king pin member and biasing said king pin member to rotate in a direction from said caster turn position to said straight ahead travel position, a first stop means for limiting rotation of said king pin shaft in a direction of turn opposite to the direction of said caster turning, and a second stop means for limiting the caster turn of said king pin shaft to a preselected maximum, said first stop means includes a member fixed relative to said arm and engagable with said king pin member to limit the rotation of said king pin shaft to a counter caster turn direction for positioning said king pin member in substantially a straight ahead travel position of said king pin.

19. A mounting assembly as defined in claim 18, wherein said castering turn between the positions determined by said first and second stop means is about 55 degrees.

* * * * *

UNITED STATES PATENT AND TRADEMARK OFFICE
CERTIFICATE OF CORRECTION

PATENT NO. : 5,562,167
DATED : October 8, 1996
INVENTOR(S) : HONEY

It is certified that error appears in the above-indentified patent and that said Letters Patent is hereby corrected as shown below:

Col. 5, Line 67 (Claim 1, Line 10) "...housing for..." should be --...bushing housing for...--.

Col. 6, line 10 (Claim 1, line 20) "...said axis rotation..." should be --...said axis of rotation...--.

Col. 6, line 62 (Claim 11, line 2) "...king pin relative..." should be --...king pin shaft relative...--.

Signed and Sealed this

Thirty-first Day of December, 1996

Attest:

BRUCE LEHMAN

*Attesting Officer*  *Commissioner of Patents and Trademarks*